United States Patent [19]

Kumar

[11] Patent Number: 5,175,831
[45] Date of Patent: Dec. 29, 1992

[54] SYSTEM REGISTER INITIALIZATION TECHNIQUE EMPLOYING A NON-VOLATILE/READ ONLY MEMORY

[75] Inventor: Niraj Kumar, Fremont, Calif.

[73] Assignee: Zilog, Inc., Campbell, Calif.

[21] Appl. No.: 446,158

[22] Filed: Dec. 5, 1989

[51] Int. Cl.[5] .............................................. G06F 12/00
[52] U.S. Cl. ...................... 395/425; 395/700;
364/244.6; 364/254.6; 364/251.5; 364/965.5;
364/957.3; 364/960.1; 364/DIG. 2; 365/95
[58] Field of Search ... 364/200 MS File, 900 MS File;
365/95; 395/425, 700

[56] References Cited

U.S. PATENT DOCUMENTS

| | | | |
|---|---|---|---|
| 4,030,073 | 6/1977 | Armstrong, Jr. | 364/200 |
| 4,430,704 | 2/1984 | Page et al. | 364/200 |
| 4,476,522 | 10/1984 | Bushaw et al. | 364/200 |
| 4,646,269 | 2/1987 | Wong et al. | 365/95 |
| 4,688,172 | 8/1987 | Wright | 364/200 |
| 4,751,636 | 6/1988 | Sibley | 364/200 |

FOREIGN PATENT DOCUMENTS 56-147215  11/1981  Japan.

Primary Examiner—Thomas C. Lee
Assistant Examiner—Paul Harrity
Attorney, Agent, or Firm—Majestic, Parsons, Siebert & Hsue

[57] ABSTRACT

Initial data and/or control bits of registers within a digital integrated circuit are loaded from a non-volatile and/or read-only memory provided as part of the circuit. Such loading is accomplished each time the circuit is initialized, such as when power is first turned on to a system in which the circuit is a part. An important use of this technique is with a computer peripheral circuit chip such as a serial communications controller.

9 Claims, 2 Drawing Sheets

SYSTEM REGISTER INITIALIZATION TECHNIQUE EMPLOYING A NON-VOLATILE/READ ONLY MEMORY

BACKGROUND OF THE INVENTION

This invention relates generally to the initialization of digital electronic circuits and, more specifically, to a technique of loading initial data and/or a control bits into registers of digital circuits.

Digital circuits of almost every type generally include small amounts of volatile register memory that is regularly used as part of the operation of the circuit. The registers may be used for temporary storage of data that is being routed through the circuit, or to control operation of a part or all of the circuit, or both. The registers may be physically positioned together in an implementation of a particular digital circuit, or may be distributed throughout that circuit. In any event, the registers must be loaded with initial values in order to begin operation of the circuit. An example of when this is necessary is when power is first turned on to the circuit.

An example of where such digital circuits are utilized is in a computer system. A computer system is made up of many individual integrated circuit chips that are interconnected by bus and control lines. Typically, a computer system includes a microprocessor (CPU) chip, one or more non-volatile and/or read-only-memory (ROM) chips, one or more volatile random-access-memory (RAM) chips, and a plurality of chips for communicating with various peripherals such as a computer system keyboard, modem, printer, monitor, disk drive, and the like. Each of these peripheral communication chips usually includes a number of registers which need to be loaded with initial data and/or control bits when power is first turned on to the computer system or when the system is desired to be initialized for some other reason.

The current predominant technique for doing so involves maintaining the initial values for each register in the computer system memory, such as in ROM or in disk storage. Upon the computer system being initialized, the CPU then transfers each register's data and/or control bits from such storage to the peripheral registers, one at a time. The registers of one peripheral circuit are loaded, and then those of others are loaded, one at a time. These transfers each take a significant amount of time and thus results in a lengthy execution of an initialization program in complex computer systems.

Therefore, it is primary object of the present invention to provide a simplified and faster initialization technique and circuits for carrying it out.

SUMMARY OF THE INVENTION

Briefly and generally, the present invention employs non-volatile and/or read-only-memory as part of each individual circuit for storing the initialization data and/or control bits of that circuit's registers. Upon initialization, that information is then transferred from this memory into each of the registers. This is particularly advantageous in a computer system since this loading can be accomplished much faster from local memory in each circuit instead of having to transfer the initial data from system memory. Each system transfer involves a number of individual steps under the control of the system CPU, while fewer steps are required to transfer data to the circuit registers from local memory. This technique also allows the simultaneous initialization of the registers of a number of circuits, thus further speeding up the process. Further, the technique of the present invention eliminates the need for system memory to be devoted to storing these initial values.

Additional objects, features and advantages of the present invention will become apparent from the following description of its preferred embodiments, which description should be taken in conjunction with the accompanying drawings.

DESCRIPTION OF A PREFERRED EMBODIMENT

Figure 1:
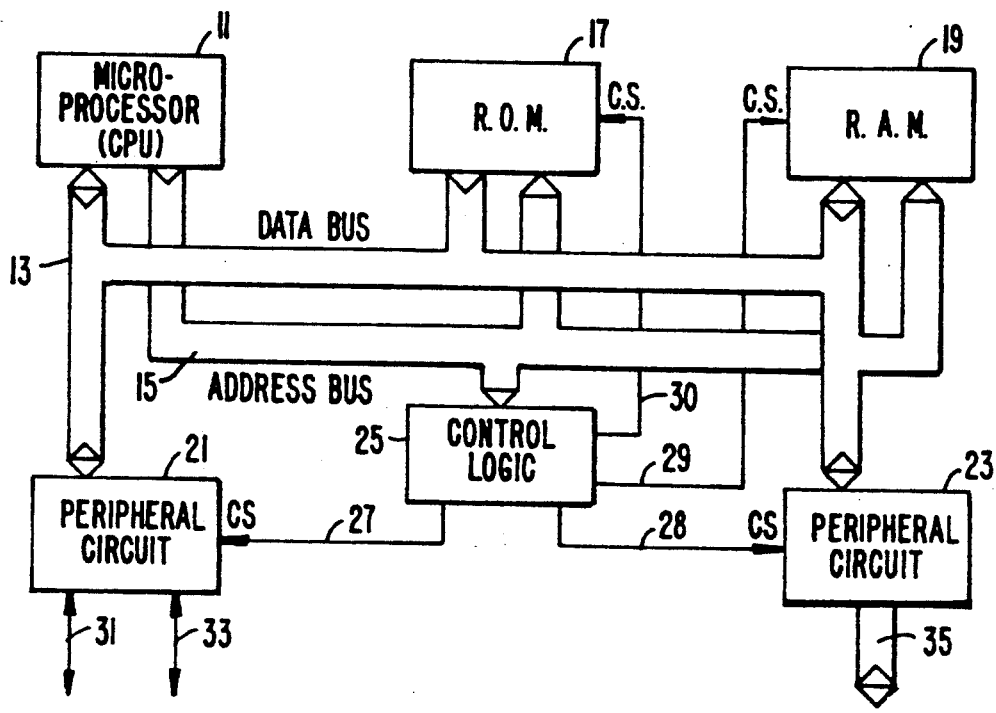
FIG. 1 is a block diagram of a computer system, an example of an environment in which the improvements of the present invention can be employed.

Referring initially to FIG. 1, a computer system having a microprocessor (CPU) 11 is illustrated. A data bus 13 and an address bus 15 interconnect the CPU 11 with other computer system components. These include a non-volatile and/or read-only-memory (ROM) 17 and some volatile random-access-memory (RAM) 19.

In order to communicate with the outside world, several peripheral communications circuits are used, two such circuits 21 and 23 being included in the system of FIG. 1 as an illustration. Control logic 25 decodes addresses on the address bus 15 and enables one of the system circuits by an appropriate chip select signal in one of the control lines 27-30. Of course, any computer system includes a number of control and status circuits not shown in the simplified example of FIG. 1. Also, the functions of the separately shown data bus 13 and address bus 15 are often combined in a single physical bus that is time shared for data and address functions.

The purpose of Figure is to illustrate a computer system in which the improved initialization technique of the present invention is implemented in its peripheral circuits. The peripheral control circuit 21 can be, for example, a serial communications controller that operationally connects one or more serial data peripheral ports with parallel data on the data bus 13. In the example being described, the circuit 21 is a two-channel device, providing separate serial data input-output ports 31 and 33. Each of these ports can be connected to an individual peripheral device such as a printer, a modem, and the like, which have a serial data input-output connection.

The second peripheral circuit 23 is shown in FIG. 1 to be of a type that has a parallel data output 35. Of course, the types of peripheral circuits that are utilized depend upon the precise computer system configuration desired. Disk drive and graphics controllers are two types of peripheral circuits that have not yet been mentioned. Each of the blocks 11, 17, 19, 21 and 23 of the FIG. 1 computer system are most commonly configured from one or more separate integrated circuit chips distinct from the others but increasing integrated circuit density is leading to the combining of some of these functions on a single chip.

Figure 2:
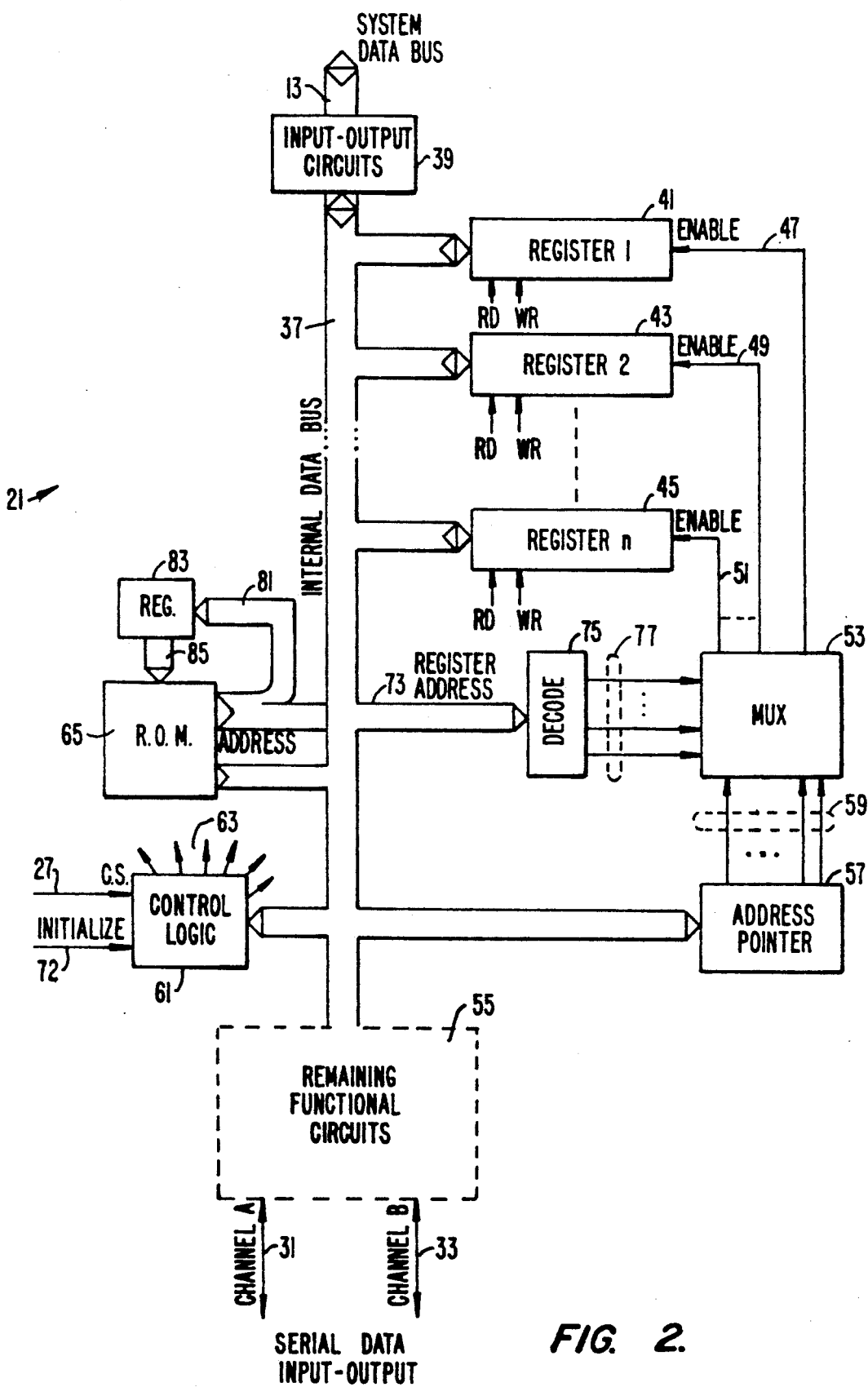
FIG. 2 is a schematic diagram of a peripheral circuit of the computer system of FIG. 1 in which the techniques of the present invention are utilized.

In order to illustrate the present inventive technique in some detail, the peripheral circuit 21 of FIG. 1 is shown in a block diagram form in FIG. 2, as an example. A data bus 37 is internal to the circuits of the chip 21 and communicates with the system data bus 13 through appropriate input-output circuits 39. The circuit of FIG. 2 includes a plurality of temporary data storage registers 41, 43 ... 45. Any number of registers can be initialized by the technique of the present invention. Typically, such a peripheral circuit will have 16 or 20 such registers. Each of the registers is connected with the internal data bus 37 and has individual enable control lines 47, 49 51 connected to a multiplexing (switching) circuit 53. A proper signal in one of the lines 47, 49 . . . 51 enables the register to which that line is connected to read data to or write data from the internal data bus 37.

The registers shown in the circuit of FIG. 2 function along with remaining operational circuits 55 to process and communicate data between the system data bus 13 and the two serial data input-output ports 31 and 33. The registers are illustrated separately from the rest of the functional circuits connected to the internal data bus 37 since it is these registers that are initialized according to the inventive technique described below.

Before describing this technique, however, the standard way that data is written into and read from the registers 41, 43 . . . 45 during normal operation of the circuit is explained. An address decoding circuit 57 is connected to the internal data bus 37. When the system CPU 11 responds to an instruction to read or write a particular one of the registers, a unique address for that register is sent by the CPU to the data bus 37. When that address is received by the decoding circuits 57, a register enable signal is generated in one of the individual circuits 59 that is connected through the multiplexer 53 to the desired register. While that register is enabled, the CPU 11 subsequently sends data to the bus 37 to be written into the enabled register or reads data from that register. Control circuits 61 that are connected to the internal data bus 37 and to various control and status lines of the computer system assist in this operation. The control logic 61 is illustrated generally to have a number of individual control output circuits 63, two of which are read (RD) and write (WR) signals that are connected to each of the registers in order to control whether a read or write operation on the selected register is to be performed.

When the computer system of Figure is initialized, each of the registers in FIG. 2 generally must be programmed with an initial set of data and/or a control word. The most common need for such initialization is when power is first turned on to the computer system after it has been off for a time. The usual technique is for the CPU 11 to write a data word into each of the registers from the ROM 17 or external disk storage, one at a time. It can be seen that this involves a number of steps to load each register. The initial data must first be located and read out of computer system memory, the destination register accessed and then the initial data written into the register. This series of steps is accomplished for each of the registers of the peripheral unit 21 until each register is loaded, and then the CPU 11 proceeds to do the same thing for each other peripheral or other register containing circuit of the computer system.

The improvement of this invention, illustrated in FIG. 2, is the storage of the initial register data and/or control bits in a non-volatile and/or read-only memory (ROM) 65. The memory 65 is preferably a mask programmed ROM, using a single or multiple mask layers, but can alternatively be non-volatile EPROM or EEPROM.

Figure 3:
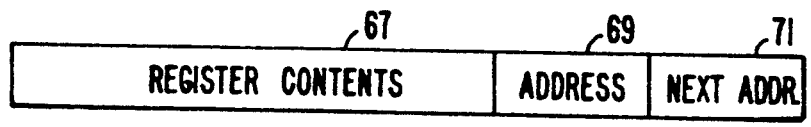
FIG. 3 shows data content of a memory of FIG. 2.

The form of the digital information stored in the ROM 65 for each of the registers 41, 43 ... 45 is illustrated in FIG. 3. A major component of the digital information is initial data and/or control bits 67 that are to be stored in a designated register. Another component is a series of bits 69 that specify the address of the register into which the initial data 67 is to be written. Another component of this information, according to a preferred implementation, is a next address within the ROM 65 of the digital information that is to be next accessed from the ROM 65 for initializing the next register in order.

As a result, in response to an initialization signal in a line 72 from the computer system, the process of loading the registers one at a time is commenced. Either the CPU 11 or a portion of the control logic 61 designates the first ROM 65 address to be read. The initial data bits 67 (FIG. 3) at that ROM address is then read onto the internal data bus 37 and is available to each of the registers. The one register that is enabled is specified by its address component 69 (FIG. 3) of the digital information located at that ROM 65 address. That register address is read onto an internal address bus 73. That address is decoded from the bus 73 by a circuit 75 and one of the register enable lines 77 is activated. That activated line is communicated through the multiplexer 53 to enable a single one of the registers corresponding to the address 69 that has been read onto the address bus 73. The initial data 67 on the internal data bus 37 is then written into the designated register.

It will be noted that this technique utilizes the data bus and register enable lines that are already in place and necessary for the functional operation of the circuit. The multiplexer 53 allows these lines to be connected to either the address decoding circuits 57 for such normal operation, or to the decoding circuit 75 for the initialization operation. This switching of the multiplexer 53 is accomplished by a control signal in a circuit (not shown) from the control logic 61. The initialization process is accomplished with very few sequential steps being necessary to initialize each register.

After the first register is loaded, either the CPU 11 or a control sequence within the logic 61 will cause the ROM 65 to be addressed in order to read out the data and/or control word 67 and register address 69 for the next register in order. There are various ways that the ROM 65 address can be incremented to this new location, including the use of an address counter or the designation of that address by the CPU 11. A preferred alternative technique illustrated in FIGS. 2 and 3 is the use of the next ROM address data bits 71 (FIG. 3) which are read out onto a separate portion 81 of the internal address bus when the initial data for the first register is read out of the ROM 65. At that time, this next ROM address is stored in a temporary register 83. Thus, the next ROM 65 address exists at its address input 85 and will read out the digital information in the format of FIG. 3 for the next designated register. This technique makes it very simple, fast and free of errors to step through the various ROM 65 addresses for loading the registers one at a time with their initial data and/or control word from the initialization program.

It is preferred that each peripheral and other circuit chip of a computer system that needs such initialization have its registers loaded simultaneously, thus greatly speeding up the overall system initialization. Microcode can be provided in a straight forward manner as part of the control logic 61 in order to control downloading the initial bits from the ROM 65 to the various registers in the manner discussed above. The process begins in response to detection of a system initialization instruction from the system CPU 11 over the system data bus 13.

Although the present invention has been described with respect to its preferred embodiment, it will be understood that the invention is protected within the full scope of the appended claims.

It is claimed:

1. In an integrated circuit chip adapted to connect between a computer system bus and a peripheral device and having a plurality of internal registers, a circuit provided as part of said chip for initializing said plurality of internal registers, comprising:

a non-volatile and/or read-only memory means containing a plurality of words, each of said words being uniquely associated with one of said plurality of internal registers and including initial data for said one of said plurality of internal registers, a register address of said one of said plurality of internal registers, and a memory address of a next word uniquely associated with a next one of said plurality of internal registers, and means connected to said system bus, said memory means, and said plurality of internal registers and responsive to a single instruction on said system bus for loading said initial data for each of said plurality of words into each of said plurality of internal registers; whereby said loading means fetches said initial data from the memory means for a selected one of said plurality of internal registers in response to said single instruction and fetches said initial data from said memory for next ones of said plurality of internal registers based upon the memory address of a next word included with said fetched initial data.

2. The circuit of claim 1 wherein said data loading means includes means for decoding the register address of each word and enabling writing of initial data of that word into an internal register uniquely associated with that word.

3. The circuit of claim 2, wherein said plurality of words are organized in said memory means in a predetermined sequence.

4. The circuit of claim 3, wherein said memory means further comprises means for storing a next memory address to be accessed in said memory means, said storing means including a storage register, wherein said decoding and enabling means decodes the register address of a word while said storing means simultaneously stores a memory address corresponding to a next word in said predetermined sequence in said storage register.

5. The circuit of claim 1 which additionally includes means connected to said plurality of internal registers for interfacing and communicating with said peripheral device.

6. The circuit of claim 5 wherein said interfacing and communicating means is characterized by providing a serial data circuit for communicating with said peripheral device.

7. A digital electronic circuit, comprising:

a data bus connected to a computer system bus through an interface circuit, means including a plurality of registers connected to said data bus for establishing communication between the computer system bus and a data port, a non-volatile and/or read-only memory connected to said data bus and containing a plurality of words, each of said plurality of words associated with one of said plurality of registers and comprising initial bits for said one of said plurality of registers, an address of said one of said plurality of registers, and a memory address of a next word corresponding to a next one of said plurality of registers, and means connected to said memory, said data bus, and said plurality of registers and responsive to a single instruction on said system bus for simultaneously reading from the memory onto the data bus the initial bits and said register address of said one of said plurality of registers and said memory address associated with said next one of said plurality of registers, and enabling said one of said plurality of registers to receive said initial bits from said data bus, whereby the plurality of registers are sequentially loaded through the data bus, one register at a time by said means for reading and enabling, such that said means for reading and enabling uses the memory address to read the initial data from memory for loading next ones of said plurality of registers in subsequent cycles.

8. The circuit according to claim 7 wherein said data port is a serial data input/output port and said communication establishing means includes means for transmitting data between said data port in serial form and said data bus in parallel form.

9. A peripheral data communications circuit, comprising:

a data bus that is connected to a computer system bus through an interface circuit, means including a plurality of registers connected to said data bus for establishing communication between the computer system bus and a data communications port, said communication establishing means including means connected to said data bus for selectively addressing individual of the plurality of registers in accordance with an address on the data bus, thereby to allow its data contents to be read to or written from the data bus, a non-volatile and/or read-only memory containing a plurality of words, each word comprising initial bits and an identifying address of an individual one of said plurality of registers, and an address of a memory location containing an identifying address of a next individual one of said plurality of registers, and means connected to said data bus, said plurality of registers and said memory and responsive to a single instruction on said computer system bus for simultaneously reading onto the data bus the stored initial bits of said individual register, reading into said selective addressing means an address of said individual register from said memory, whereby said individual register is loaded with the initial bits, and reading the memory location of said next individual register for use in reading, in a subsequent cycle, initial bits of said next individual register; whereby said plurality of registers are sequentially loaded with their corresponding initial bits from memory through the data bus, one register at a time.

* * * * *